(No Model.) 2 Sheets—Sheet 1.

R. E. SHANNON.
Horse Holding Attachment for Vehicles.

No. 237,615. Patented Feb. 8, 1881.

Witnesses
Geo. H. Strong.
Frank A. Brooks.

Inventor
Richard E. Shannon
By Dewey & Co.
Attys.

N. PETERS, PHOTO-LITHOGRAPHER, WASHINGTON, D. C.

(No Model.) 2 Sheets—Sheet 2.

R. E. SHANNON.
Horse Holding Attachment for Vehicles.

No. 237,615. Patented Feb. 8, 1881.

Witnesses
Geo. H. Strong
Frank H. Brooks

Inventor
Richard E. Shannon
By Dewey & Co.
Attys.

UNITED STATES PATENT OFFICE.

RICHARD E. SHANNON, OF SAN FRANCISCO, CALIFORNIA, ASSIGNOR OF ONE-HALF TO A. T. F. OBERMEYER, OF SAME PLACE.

HORSE-HOLDING ATTACHMENT FOR VEHICLES.

SPECIFICATION forming part of Letters Patent No. 237,615, dated February 8, 1881.

Application filed November 26, 1880. (No model.)

*To all whom it may concern:*

Be it known that I, RICHARD E. SHANNON, of the city and county of San Francisco, State of California, have invented an Improved Horse-Holding Attachment for Vehicles; and I hereby declare the following to be a full, clear, and exact description thereof.

My invention relates to a new and useful device or attachment for vehicles, having for its object the holding of horses when attached to vehicles and left standing.

My invention particularly appertains to that class of horse-checking devices operated by gear-wheels attached to the hub of the vehicle; and it consists in certain details of construction, as hereinafter more particularly described and claimed.

By referring to the accompanying drawings and subsequent more particular description, those skilled in the art may see how to construct my invention.

Figure 1:
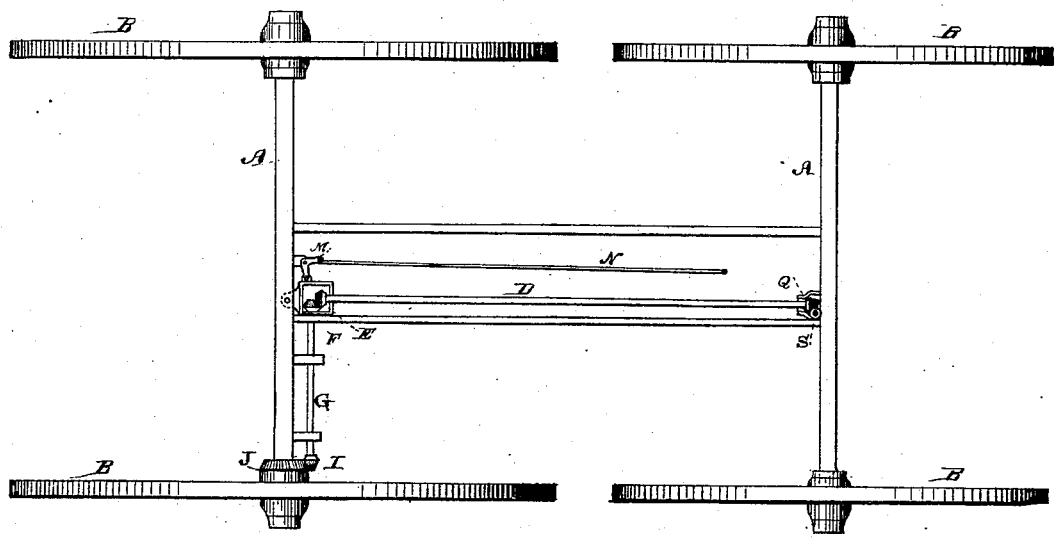
Figure 2:
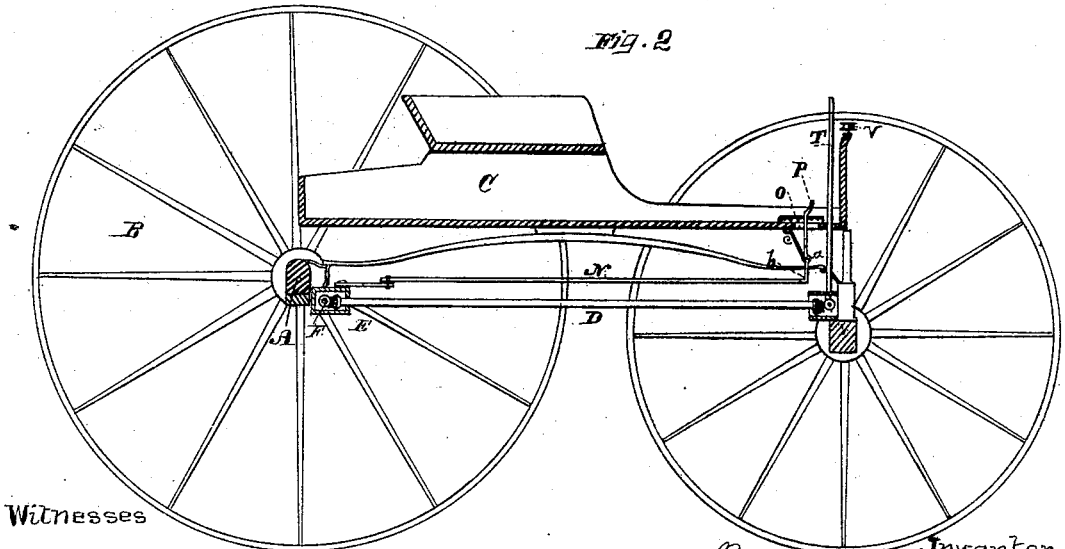
Figure 3:
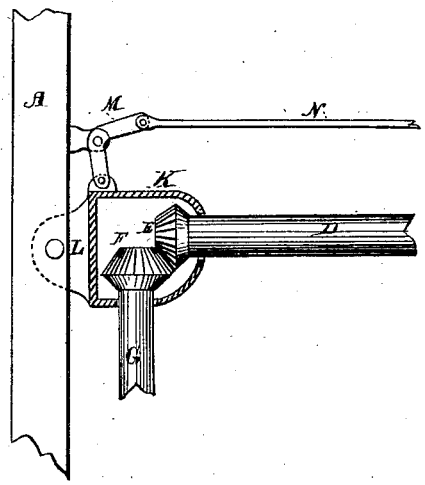
Figure 4:
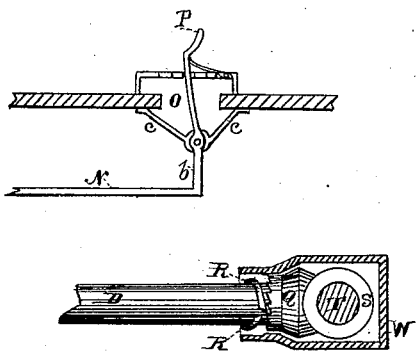
Figure 4:
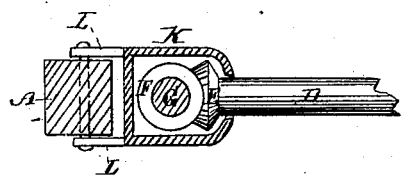
Figure 5:
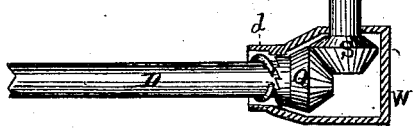
Figure 5:
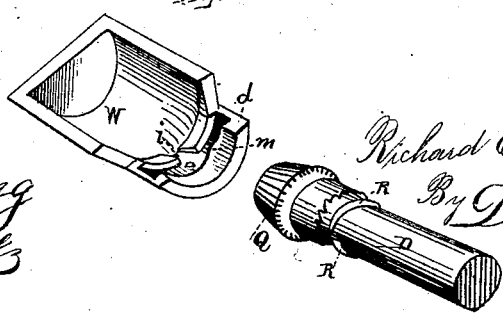

Figure 1 is a top view of the axles and wheels of a buggy or wagon with my device. Fig. 2 is a longitudinal section showing the same. Figs. 3, 4, and 5 are details of construction.

The running-gear of the vehicle consists of the axles A, wheels B, body C, and other parts usually found on vehicles. Under the body C, and running its length between the axles, is the shaft D, terminating in its rear end in the bevel-pinion E, which meshes with another bevel-pinion, F, on the rod G, as shown. The rod G is fastened by appropriate braces, which permit of its turning to the rear axle A. Its outer end is provided with the bevel-pinion I, which meshes with the cogs J on the inner side of the hub of the wheel. These cogs J could be put upon the hub of either rear wheel; but I prefer them upon the right-hand rear wheel, as shown. The cogs J are made upon a metal band, which is fitted over the hub. Thus they can be easily attached to any wheel.

The bevel-gear wheels E and F are contained within the boxing K, pivoted to the rear axle A, by the flange L, so that the bell-crank lever M, pivoted to the rear axle A, as shown, may draw it and the gearing within it a little to one side, so as to throw the mechanism upon the hub of the wheel out of gear.

The bell-crank lever M is operated by the rod N passing forward and turned at right angles upward at the point *b*, and pivoted at *a* to a brace, *c*, suspended from the body of the vehicle. The rod N passes up through the slot O in the body of the vehicle and terminates in a stirrup, P, within reach of the driver's foot. A small spring and teeth in the side of the slot O adjust and fix the foot-lever P. By pressing this stirrup forward the boxing K is moved toward the right-hand rear wheel, so that the mechanism is thrown in gear. The rod D passes forward to the front axle and is provided with an independently-running gear-wheel, Q, having notches on its rear side, whereby the ratchets or feathers R on the rod D hold it to turn with the rod when turning in the proper direction, as will be more fully described hereinafter.

The loosely-running gear-wheel Q meshes with a bevel-pinion, S, on the end of the upright standard T. This upright standard T passes up through the body of the vehicle either behind or in front of the dash-board, and to a height a little above it. It is provided with a notch or slot, U, in its top, to let the lines slip in, so that when the standard T is turned the lines will wind up around it. The small rollers V are placed upon opposite sides of the top of the dash-board, and are intended for the lines to pass over in being conducted to the slot U, in which they fall, thus to keep the horses' heads straight by widening the distance between the lines and keeping them taut. The gear-wheels Q and S are contained within the boxing W, attached to the bolster or head-block.

I will now describe the construction of this boxing W and its object.

When the lines are wound up around the upright spindle or rod T and the horse checked up, he requires to be instantly released, else in his anxiety he may injure the vehicle. His first impulse upon finding himself checked is to back slightly. It is this movement I take advantage of to accomplish his relief. The bevel-gear wheel Q is not attached to the rod or shaft D, but runs loosely upon its end. The upright shaft T fits through the upper part of the boxing W, so that its pinion S meshes with the gear-wheel Q. The boxing W is made large at one end, and tapering down until it terminates in a cylinder, d, just large enough to admit the turning of the shaft D within it. On the inner surface of the cylinder, near where it begins to widen into the tapering shape, is the groove e, having two outlets, as shown at i, into the wider part. Two feathers or ratchets, R, are pivoted through their centers on opposite sides of the shaft D, and in the same relative position. These feathers R just fit the groove e, and revolve with the shaft D. In the groove e is the slight enlargement m, just forward of the outlets i. Now, when the shaft D is turned by the forward motion of the wheel, the feathers R travel within the groove e until their heads are directed and assisted by the enlargement into the outlets i, through which they pass (just as a screw penetrates) into the enlarged portion of the boxing, and, meeting the notches on the rear end of the loosely-running gear-wheel Q, engage with them and carry the wheel Q around with the shaft. As long as the motion is forward the feathers R travel in the enlarged portion of the boxing, and thus the upright standard T is turned and the lines wound up; but the moment the horse backs the motion of the wheel revolves the shaft the other way, and the tails of the feathers R, when they reach the outlets i, drop in, and the whole feather recedes within the groove e. This frees the loose gear-wheel Q, and the upright standard T turns backward and unwinds the lines instantly.

The operation of the entire device will be as follows: When the vehicle stops, I throw the lines one around each roller V, and let both fall into the slot U in the top of the upright standard T. I press the stirrup P forward, which action pushes the rear boxing, K, sufficiently to throw the bevel-pinion I and the cogs J upon the wheel in gear. Now, if the horse moves forward the rod G turns, which turns the shaft D, which pushes the feathers R into operation with the loosely-running gear-wheel Q, which, meshing with the gear S, turns the upright standard T and winds the lines up, thus checking the horse. Upon finding himself checked in that manner his first impulse is to back, which, when he does, turns the shaft D backward, withdrawing the feathers R, and freeing the gear Q, which releases the standard T, and the lines are unwound and slackened. Because the rear boxing, K, is loosely pivoted to the rear axle, the shaft D has sufficient play to allow the feathers R to move it enough to advance to or recede from the rack on the gear Q. The boxing W is pivoted loosely to the bolster, and may be put onto the front or rear of the head-block, depending upon the construction of the vehicle.

Having thus described my invention, what I claim as new, and desire to secure by Letters Patent, is—

1. The box K, forming a journal for the two shafts D and G, and inclosing the pinions E and F, said box having a flange or projection, L, so pivoted or hinged that the box may be swung to one side by the action of the bell-crank lever M, so as to throw the pinion I in or out of contact with the gear J on the wheel-hub, substantially as herein described.

2. The combination of the boxing W, with its groove e, outlets i, and enlargement m, and the shaft D, with its feathers or ratchets R, and the loosely-running gear-wheel Q, provided with ratchet-teeth on its rear end, substantially as and for the purpose herein described.

In witness whereof I have hereunto set my hand.

RICHARD E. SHANNON.

Witnesses:
S. H. NOURSE,
WM. F. BOOTH.